(12) United States Patent
Georgi

(10) Patent No.: US 6,618,322 B1
(45) Date of Patent: Sep. 9, 2003

(54) METHOD AND APPARATUS FOR MEASURING ACOUSTIC MUD VELOCITY AND ACOUSTIC CALIPER

(75) Inventor: Dan T. Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/924,995

(22) Filed: Aug. 8, 2001

(51) Int. Cl.[7] ............................. G01S 15/08; G01V 5/08
(52) U.S. Cl. ........................ 367/27; 367/34; 367/35; 181/105
(58) Field of Search ................ 367/27, 34, 35, 367/99; 175/45; 166/253.1, 254.2, 255.1; 181/105

(56) References Cited

U.S. PATENT DOCUMENTS

| | | | | |
|---|---|---|---|---|
| 4,022,055 A | * | 5/1977 | Flournoy et al. | 73/67.7 |
| 4,979,151 A | * | 12/1990 | Ekstrom et al. | 367/35 |
| 5,341,345 A | * | 8/1994 | Warner et al. | 367/99 |
| 5,354,956 A | * | 10/1994 | Orban et al. | 181/105 |
| 5,430,259 A | * | 7/1995 | Warner | 181/105 |
| 5,451,779 A | * | 9/1995 | Spross et al. | 250/266 |
| 5,469,736 A | * | 11/1995 | Moake | 73/151 |

FOREIGN PATENT DOCUMENTS

EP  505261  * 9/1992

OTHER PUBLICATIONS

Minette et al, Annual SPE Tech. Conf. Oct. 6, 1999, pp 109–122 : SPE 56447.*
Heam, F; Harts E&P, vol. 73, # 6, pp 69–70 Jun. 2000.*
Molz, E. B., 41st Annual. SPWLA Loggins Symp. Jun. 7, 2000, pp 1–6.*

* cited by examiner

Primary Examiner—Nelson Moskowitz
(74) Attorney, Agent, or Firm—Madan, Mossman & Sriram, P.C.

(57) ABSTRACT

A method and apparatus for determining acoustic mud velocity and bore hole caliper in a downhole environment. A highly accurate acoustic signal is adjusted for mud velocity as continuously measured. The borehole standoff is utilized to compensated data collected downhole in determining a parameter of interest in the wellbore or an adjacent formation.

34 Claims, 3 Drawing Sheets

VERTICAL
APPERTURE

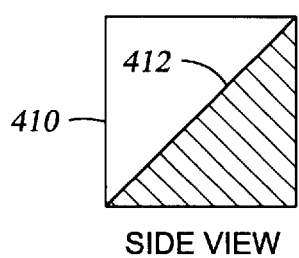
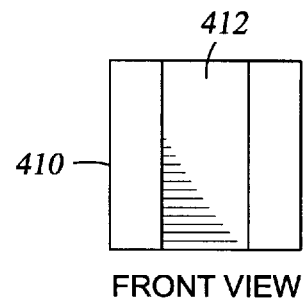
Fig. 4A  Fig. 4B
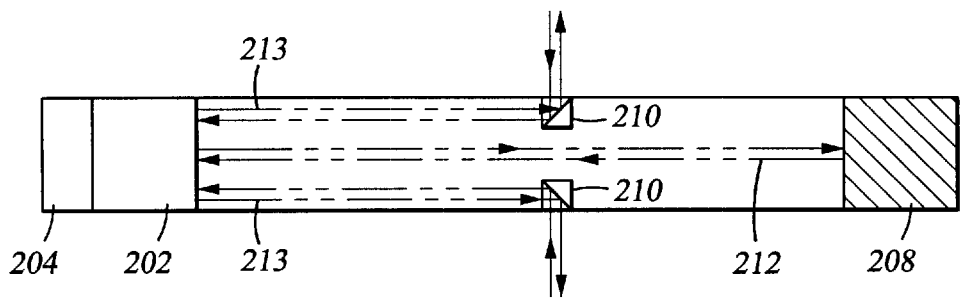
Fig. 5
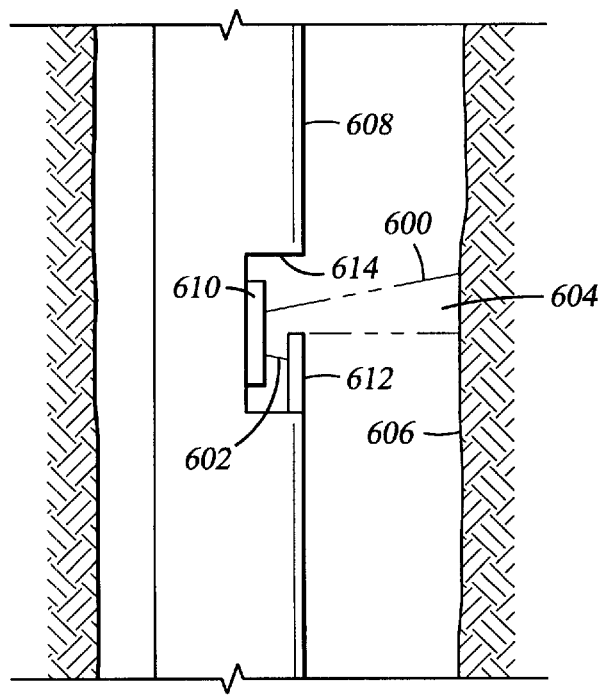
Fig. 6

METHOD AND APPARATUS FOR MEASURING ACOUSTIC MUD VELOCITY AND ACOUSTIC CALIPER

CROSS REFERENCE TO RELATED APPLICATIONS

This patent application is related to copending U.S. patent application Ser. No. 09/896,463, filed on Jun. 29, 2001 entitled Method for Correcting Downhole NMR Data Contaminated by Borehole Signals by Dan Georgi, Songhua Chen and Holger Therm, which is hereby incorporated herein by reference.

BACKGROUND OF THE INVENTION

1. Field of the Invention

The invention relates generally to the field of downhole hydrocarbon recovery and formation analysis and in particular to a method and apparatus for measuring acoustic mud velocity and acoustic caliper in the downhole environment.

2. Description of the Related Art

Borehole caliper is an important factor in the available accuracy and effectiveness of downhole data gathering instruments. Spatial irregularities in the borehole walls can adversely affect data integrity, unless these irregularities are detected and accounted for in data processing and/or acquisition. Borehole rugosity adversely affects downhole data measurements which are designed to assess the potential for hydrocarbon bearing formations adjacent a borehole. For example, cavities in the borehole wall can adversely affect measurements taken by downhole devices such as Nuclear Magnetic Resonance (NMR) devices. Thus, there is a need for an accurate downhole measurement of borehole rugosity.

NMR devices are typically used in determining properties for an adjacent formation, such as porosity of the material, permeability, the bound liquid volume, the clay bound volume (CBW) and bulk volume irreducible (BVI), as well as formation type and oil content. The principle of NMR works because atomic nuclei contain magnetic moments associated with their nuclear spin. When these nuclei are subjected to an applied static magnetic field, their magnetic moments tend to align either parallel or anti-parallel to this field. In a typical NMR device used in logging, a permanent magnet produces the static magnetic field and establishes the direction of orientation for the magnetic moments in a given volume of space. Typically in the art, a transmitter coil is placed near this region in order to induce a RF magnetic flux into this volume by means of the circuitry to which it is attached. The transmitter coil is oriented such that the magnetic field it induces into the volume lies substantially in the plane that is perpendicular to the static magnetic field. This volume of space where the two magnetic fields are essentially orthogonal is herein referred to as the sensitive region. By applying this RF magnetic field, the RF field can rotate the nuclear spin vectors within the sensitive region out of alignment with the static field.

Typically, the RF transmitter coil induces a RF magnetic pulse whose duration is timed to reorient the magnetic moments of the nuclei along a direction that is orthogonal to the static field of the permanent magnet. Once the spin moments are perpendicular to the static field and the RF pulse is removed, the magnetic moments undergo two notable processes. Firstly, the spins realign along the direction of the static magnetic field. This decay back along the direction of the static field occurs over a characteristic time scale called the spin-lattice relaxation rate, $T_1$. Secondly, since the magnetic moments are non-aligned with the static field, they experience a perpendicular force which causes them to precess around the static field. This rate of precession is known as the Larmor frequency and is proportional to the strength of the static field. The decay of the spin magnetization in the plane perpendicular to the static field is known as the spin-spin decay and is characterized by its decay rate, $T_2$.

Each molecule has its own characteristic values of $T_1$ and $T_2$. The practitioner of the art is skilled in interpreting NMR logging results in order to determine the composition of materials inside the sensitive region. If the sensitive region is comprised of many types of materials, the signal is an accumulation of all of their signals.

Typically, it is desirable to contain the entire sensitive region within the-rock formation. In most geometries, the sensitive region is a cylindrical shell which is coaxial to the permanent magnet, although other spatial arrangements can be produced. Since the sensitive region lies close to the surface of the borehole cavity, geometric anomalies in the surface of the wellbore can cause portions of the sensitive region to lie inside the borehole cavity rather than inside the rock formation, causing NMR signals to be received from what is contained inside the borehole, usually drilling mud. Drilling muds are oil or water based and hence have a large number of hydrogen nuclei: these are a strong source of contaminating NMR spin echo signals that may be stronger than the desired signals from the rock formation. Prior methods have used caliper arms to determine the distance from the tool body to the borehole wall, however, such methods are crude and do not yield precise measurements. Thus, there is a need for a method and apparatus to precisely determine borehole caliper or radius and the distance from the NMR tool to the wellbore wall to enable determination of the extent to which the region of investigation is within the borehole and/or within the formation.

As another example of a possible anomaly, the drilling tool can be off-axis with the borehole and additionally can be lying against one side of the borehole, permitting a portion of the sensitive region to full within the borehole cavity. In another example, the drill hole might have an elliptical cross-section rather than a circular one. In yet a third possibility, there can be a significant amount of washout, where certain segments of the borehole wall have separated and fallen away, leaving a cavity to one side of the borehole. Drilling muds typically have densities and structural nuclear values different from that of the surrounding rock formation. Contamination of wellbore signals in NMR by mud signals spoils all critical petrophysical estimates including porosity, permneability, and $T_2$ distribution.

Pad or skid NMR tools have a depth of investigation of about 0.5" to 1". When the sensitive region lies so close to the surface of the borehole, as is the case in NMR logging, the rugosity of the surface becomes important. With a high rugosity, there is ample opportunity for mud to enter into the NMR sensitive region and permitting anomalous signals to contribute to the receiver formation signal. Borehole rugosity enables the mud volume to distort and infringe upon the measurements within the sensitive volume. Precise knowledge of this borehole rugosity can alert the practitioner that the data needs to be flagged.

Although corrections for invasive mud signals have been made in other logging methods, there is no similar method designed for use in NMR well logging. U.S. Pat. No. 3,321,625 (Wahl et al.) corrects for the effects of mud in gamma-gamma logging, using the knowledge of the mud density. U.S. Pat. No. 4,423,323 (Ellis et al.) addresses the problem in neutron logging. Thus there is a need for a method and apparatus for precisely determining borehole rugosity factors, comprising borehole caliper, stand off distance from a measuring tool to the bore hole wall and acoustic mud velocity and has been proposed in a separate application.

Physical limitations make it difficult to build side looking NMR tool that traverses a borehole and reads deeply into an adjacent formation. Typical NMR tools used in wireline logging operations read only 0.25 to 3 inches into the formation. However, typical pad or skid NMR tools, read only 0.5 to 1 inches into the formation. Thus, when deviations in the borehole wall extend partially or entirely into the sensitive volume of the NMR measurement, the NMR data are influenced by that portion of the NMR signal originating from the borehole. Thus, the NMR data collected with such tools can be corrupted by NMR signals originating from the borehole mud.

Gamma-Gamma density tools also are relatively shallow reading and their readings can also be adversely affected by even small-scale vertical rugosity, in which the skid is not capable of maintaining well bore contact. It is well known that such problems can be identified from density correction curves. No similar means of identifying questionable NMR data exists for data from the MRIL or CMR tools. Thus, there is a need to make a standoff measurement simultaneously with NMR tools. Typical standoff measurements have been made with a mechanical finger. Alternatively, an acoustic standoff measurement can be made. The standoff data can then be used to quality control the NMR measurements and flag data when the borehole rugosity (e.g. the depth of washout) exceeds the measurement sensitive volume. The mechanical standoff measurements are limited in accuracy, the amount of data points gathered and resolution.

It is preferable to not only identify data that is corrupted by NMR signal coming from the borehole, but to also correct such data. Data correction is discussed in U.S. patent application Ser. No. 09/896,463. To correct the data the standoff data is used to determine what percent of the data was corrupted by washout, which can be easily determined from the ratio of readings that exceed the depth of the sensitive volume to those that do not. The present invention then subtracts from the echo data, an echo train with the characteristic relaxation time of the borehole mud scaled to account for the amount of signal that originated from the borehole. This way both the NMR porosity and the properties derived from the echo train data will be substantially free of borehole contamination.

Acoustic standoff data requires precise acoustic velocity data to convert travel time to a precise distance. The velocity determination must be precise in order to achieve the desired accuracy of 0.1 inch in borehole diameter and 0.05 inch in standoff. Empirical correlation is available which accounts for pressure and temperature effects on the mud velocity. However, it is difficult to precisely know the makeup of the mud in the borehole at every depth and hence critical factors (e.g. water, oil and gas concentration, cuttings load, etc.) may not be known well enough to predict the mud velocity at every depth. Further, the addition of gas or suspended particles, cuttings, will also change the mud velocity. This renders measurements of standoff and/or borehole caliper based on acoustic time of flight measurements imprecise. Thus, there is a need for an accurate method and apparatus for measuring standoff and borehole caliper that does not suffer from variance due to variations in acoustic mud velocity.

SUMMARY OF THE INVENTION

The present invention addresses the shortcomings of the related art discussed above. The present invention provides a means for calibrating borehole standoff and caliper measurements. The present invention provides a fixed target that intersects only a portion of the acoustic beam and using the reflected signal from the fixed target to determine the mud velocity. It is not necessary to compute the mud velocity, as it suffices to divide the 2-way transit time to the borehole wall by the 2-way transit time to the fixed target to obtain the distance to the borehole wall. Of course, it is necessary to subtract the distance from the transducer to the reflector from the total signal path to obtain the actual standoff. The present invention provides a 45° reflector to enable construction of a thin ultrasonic standoff or caliper measurement device. The present invention provides a combination of a 45° reflector to reflect the signal to the formation and a 90° reflector to measure mud velocity. In an alternative embodiment, the present invention provides a shaped (parabolic) 45° reflector to focus the acoustic beam onto the borehole wall.

In one embodiment the present invention, the present invention determines the distance from the tool to the borehole wall, uses this distance to determine borehole invasion into the NMR sensitive volume. In another embodiment of the present invention, the present invention determines the distance from the tool to the borehole wall and corrects NMR data for the effect of the ROI invasion or overlap by borehole.

The present invention provides an acoustic standoff measurement wherein the two-way travel time is converted to distance. This conversion utilizes the precise measurement of mud velocity provided by the structure of the present invention. Mud velocity depends on the mud composition and pressure and temperature. The present invention provides a direct measurement of mud velocity and thus avoids the necessity of providing and using a second transducer for velocity measurements. In one embodiment of the present invention, the standoff transducer is recessed 0.5 to 1 inch inside the mandrel. Because the transducer is recessed, the minimum travel time will occur when the tool is flush against the borehole wall and the mud velocity can then be determined by dividing the minimum travel time by the distance the transducer is recessed. This enables conversion of the two-way travel-time data into standoff and to provide quality control and to correct NMR data for mud signal corruption. The present invention also measures signal amplitude and attenuation of the transmitted signal based on the amplitude of a return pulse from a fixed reflector and adjusts the transmitter pulse amplitude and/or receiver gain based on the amplitude from the fixed reflector to provide automatic gain control based on mud attenuation.

BRIEF DESCRIPTION OF THE DRAWINGS

FIG. 4 illustrates an alternative embodiment of the present invention wherein a 90 degree fixed target and a 45 degree reflector are located together;

FIG. 5 illustrates an alternative embodiment of the present invention wherein the position of the 90 degree fixed target and a 45 degree reflector are reversed with respect to the transponder; and FIG. 6 illustrates an alternative embodiment of the present invention wherein the sensor is located in a recess of a downhole tool.

DESCRIPTION OF PREFERRED EMBODIMENT

Figure 1A:
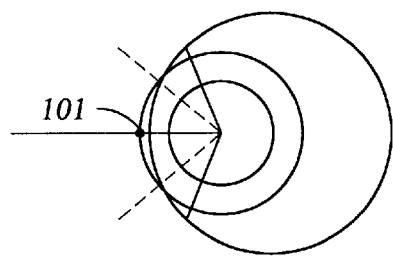
FIGS. 1A and 1B illustrate the effect a typical washout of a borehole can have on the placement of the NMR sensitive region.

The present invention provides a means for measuring acoustic mud velocity and acoustic caliper. The present invention provides a device that enables simultaneous measurement of the acoustic mud velocity, and acoustic standoff or acoustic caliper. A precise mud velocity is measured with every firing of the transducer, thus a very precise standoff and/or caliper measurement is continuously provided by the present invention. The standoff and borehole caliper measurements and correction of other signals affected by the standoff and borehole caliper. The standoff and mud velocity measurements are used to correct other sensor data (e.g. gamma-gamma density, neutron, NMR) or for borehole geometry data. The borehole geometry data may be used for drilling efficiency (sloughing vs. spalling shale vs. washed out sands) or as input into geomechanical studies.

The method and apparatus of the present invention may be used with any one of several devices. The present invention is useful whenever a precise determination of borehole caliper or acoustic mud velocity is pertinent to downhole operations, data gathering or analysis. In one example of a preferred embodiment of the invention, a configuration suitable for wireline logging is illustrated, providing a caliper and mud velocity reading in conjunction with a side-looking NMR logging tool, although the method of the invention may also be used with a centralized tool. The precise caliper measurements are utilized to correct wire line NMR measurements.

For measurement-while-drilling (MWD) applications, a suitable MWD device is disclosed in U.S. Pat. No. 6,215,304. Acoustic determination of borehole standoff is discussed U.S. Pat. No. 5,737,277 by Priest, which is hereby incorporated herein by reference. Such devices are for exemplary purposes only. Such NMR tools, as known to those versed in the art, provide a permanent magnet for generating a static magnetic field in the formation and an RF antenna assembly is to generate a pulsed RF magnetic field in a region of NMR investigation. NMR signals are detected using a receiver antenna and further analyzed to provide information about formation properties such as total porosity, clay bound water, capillary bound water and hydrocarbons. In the present example of a preferred embodiment, the present invention provides a precise mud velocity and caliper to correct NMR measurements and provide data to map the borehole rugosity.

The present invention enables detection of borehole departures, due to contributory factors such as washout, or other spatial anomalies in the borehole wall. The detected departures are used to correct data gathered in the borehole and the surrounding formation. For example, measurement of borehole departures is used to determine when the region of investigation for NMR measurements are affected by such deviations. Ideally, in wellbore logging, the sensitive volume of the NMR tool will lie entirely within the rock formation. However, when washout occurs, pieces of the rock formation fall away from the sides of the borehole wall, creating a cavity into which the drilling mud flows. If this washout region overlaps the sensitive volume of the NMR tool, then the signals received from the mud will contribute to a portion of the NMR signal. Borehole washout therefore allows the inflow of mud to contaminate the signal.

The present invention provides a highly accurate acoustic measurement of mud velocity and acoustic standoff and enables ultrasonic measurement simultaneously with mud velocity measurement, which enables precise conversion of time-of-flight data to borehole standoff or borehole caliper. The proposed sensor includes a target that allows for precise measurement of the mud velocity. The proposed layout includes an inclined reflector to enable construction of a thin sensor module and thus useable in both bottom hole stabilizers or in drill collars. A low-profile sensor module is preferably integrated into the downhole tool, comprising a transducer and 45 degree angular internal deflector, is provided inline with the longitudinal tool axis. In an alternative embodiment, the sensor is recessed from the surface of the tool to achieve the "velocity" calibration feature of this invention.

The fixed target used for reflection of the mud velocity signal measurement does not transect the entire beam of the ultrasonic transducer. The fixed target preferably intersects only 10 to 25% of the acoustic beam. This partial reflection from the fixed target provides a return signal that can be used to convert the formation return into a precise distance. The sensor is embedded in either a stabilizer blade or a "hatch cover" of a drill collar. To ensure mud exchange in the sensor, the sides of the sensor assembly are provided with grooves cut into the side of the tool housing to facilitate efficient exchange of drilling fluids that contact the sensor.

The present invention also measures signal amplitude and attenuation of the transmitted signal based on the amplitude of a return pulse from a fixed reflector and adjusts the transmitter pulse amplitude and/or receiver gain based on the amplitude from the fixed reflector to provide automatic gain control of the transmitted signal based on mud attenuation.

Figure 1B:
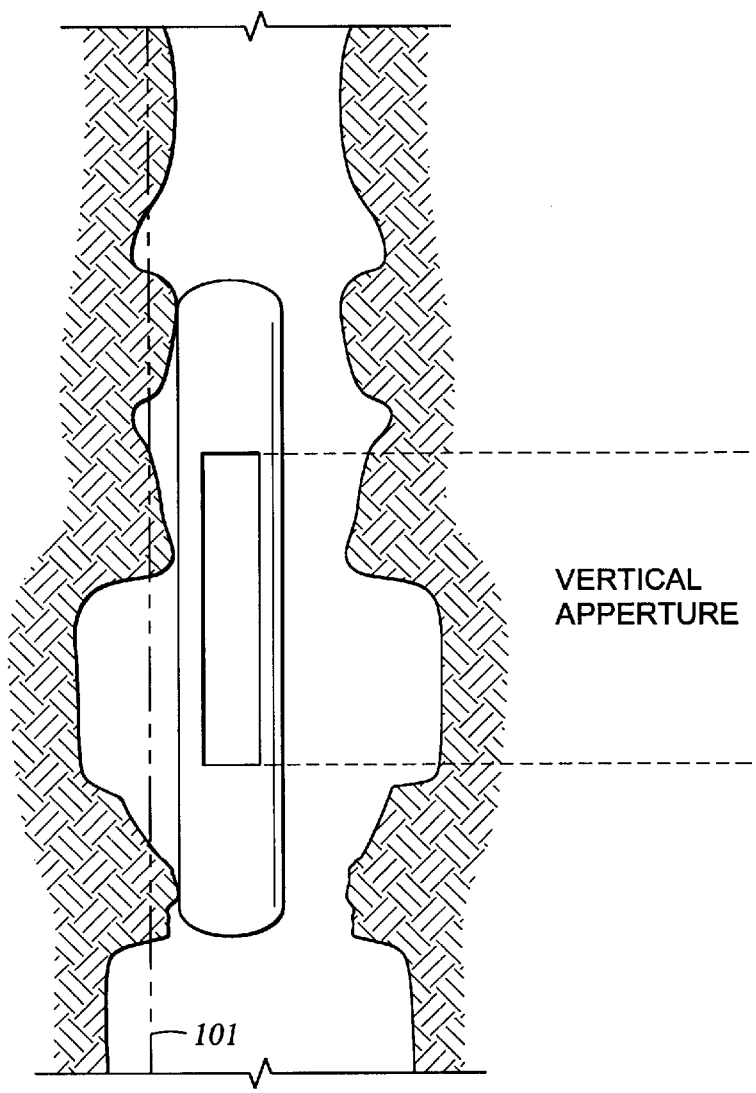

Turning now to FIG. 1, borehole departures can take an endless variety of forms. FIG. 1 illustrates a short interval washout. Point 101 indicates the location of the center depth of investigation, which is the symmetrical point of the tool sensitive volume or region of investigation. As seen in FIG. 1, washout causes some portions of the sensitive region to lie outside the rock formation, therefore allowing borehole mud to contribute to the NMR signal. In FIG. 1, the length of the vertical aperture of the NMR device is substantially greater than the length of the washout. It is also possible to have a cavity region large enough such that the entire depth of investigation along the vertical aperture lies completely within the borehole. In this situation, all of the received NMR signals would be due to the mud and none from the rock formation. To make a correct assessment of the effect of the washout on the NMR signal, it is necessary to determine the volume of the sensitive region which is occupied by mud as well as that volume which is occupied by the rock formation. To calculate these volumes, it is necessary to know the distances from points on the surface of the borehole wall to corresponding points on the surface of the NMR tool. The present invention provides a method and apparatus for precisely determining the distance from the borehole wall to points on the NMR tool and thus enables correction and compensation for the effects of borehole invasion of the NMR ROI or other effects on borehole due to variations in acoustic mud velocity and borehole standoff.

The embodiment of the invention presented herein is designed to address the problems associated with washout in wellbore drilling and logging. Specifically, the present invention provides a precise measurement of acoustic mud velocity and borehole caliper for correction of NMR signal contamination due to borehole rugosity and NMR signals received from a volume which mud occupies. The invention is comprised of a method and apparatus determining the acoustic mud velocity and borehole caliper for making corrections to compensate for borehole washout. Steps of the method of correction are disclosed in detail in co-owned, co-pending U.S. patent application Ser. No. 09/896,463.

In the embodiment utilizing an acoustic standoff device, it is necessary to know the mud velocity, either through knowledge of the controlled process or through measurement. The mud velocity depends on the composition, pressure and temperature of the mud, and these quantities must be monitored if one decides on the former method of determining mud velocity. Such monitoring requires a second transducer. It is therefore desired to have direct knowledge of the mud velocity so that it is not necessary to utilize a second transducer for measurement of pressure and temperature.

Figure 2A:
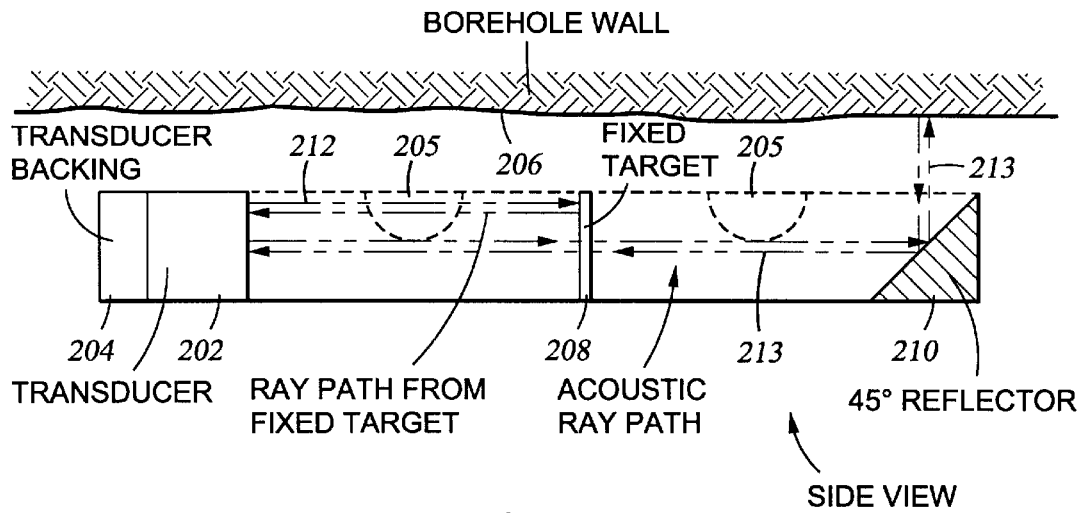
FIG. 2A illustrates a side view of a schematic cross section of a preferred embodiment of the present invention.
Figure 2B:
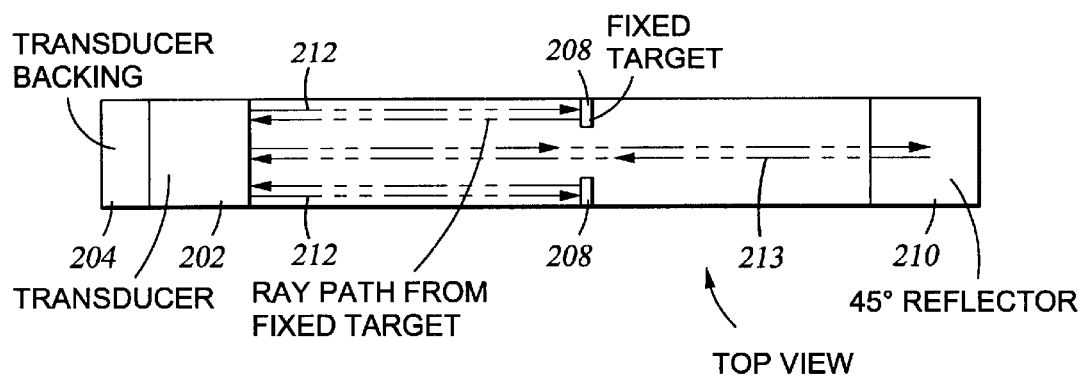
FIG. 2B illustrates a top view of a schematic cross section of a preferred embodiment of the present invention.

Details of the preferred sensor assembly are shown in FIG. 2A and FIG. 2B. In a preferred embodiment, the sensor comprises a piezoelectric (PZT) transducer 202 with a backing 204 and a fixed target 208 at about half the distance to a 450 reflector 210. The fixed target 208 partially intersects the ultrasonic beam 212 which is reflected back form the target 208 to the transducer 202. The portion of the beam intersecting the fixed target passes through mud channels 205 in order to determine acoustic mud velocity. The remaining part of the beam 213 impinges on the reflector 210 and is deflected to the borehole wall 206. At the borehole wall 206, the ultrasonic signal is reflected back towards the 45° reflector 210 where the signal is deflected back toward the transducer 202.

Figure 3:
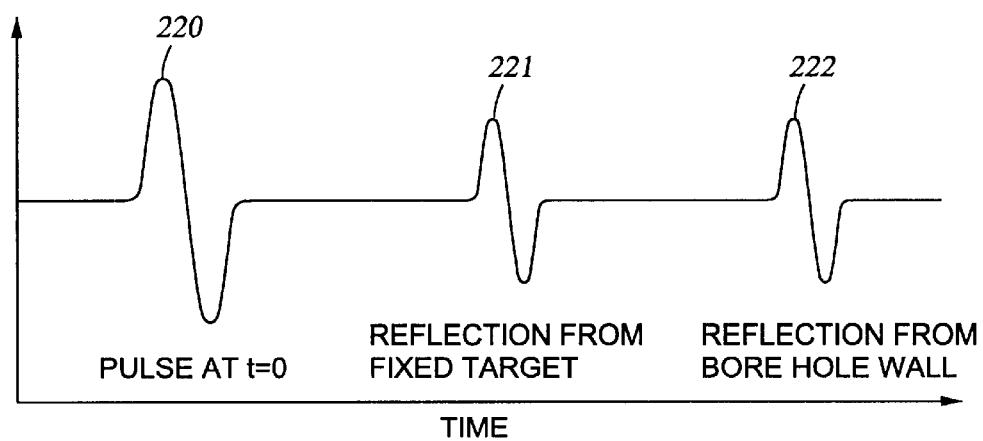
FIG. 3 illustrates a transmitted and return signal from a fixed target and a borehole wall in a preferred embodiment.

A typical signal at the transducer is shown in FIG. 3. The transmitted ultrasoncic pulse 220 is shown at time t=0. A reflection 221 of the transmitted pulse 220 from the fixed target 208 is shown at a first time after transmission at time t=0. A reflection 222 of the transmitted pulse 220 from the borehole wall 206 is shown at a second time later than the first time.

Turning now to FIG. 4, in an alternative embodiment, as shown in FIG. 4, the fixed target 410 and the 45° reflector 412 are combined. This configuration of FIG. 4 merges the reflected signal from the formation and with the fixed target signal when there is zero standoff, which may complicate the analysis of the return signals from the fixed target and the borehole when there is a small standoff, however, the alternative embodiment of FIG. 4 reduces the travel path and minimizes attenuation of the signal in the drilling mud.

Turning now to FIG. 5, in another alternative embodiment, as shown in FIG. 5, the position of the fixed target 208 and the 45° reflector 210 are reversed. Of course, the reflector intersects only a part of the acoustic beam 213, which enables the remaining portion of the signal 212 to also reflect off the fixed target.

Turning now to FIG. 6, in an alternative embodiment, the transducer 610 is recessed 0.5" to 1" inside the tool mandrel 608. A fixed target 612 intersects a portion 602 of the beam and the remaining beam 604 is reflected off of the borehole wall 606. In this position, the minimum travel time occurs at the point where the tool mandrel 608 is flush against the borehole wall 606. The mud velocity then is most easily determined by dividing the minimum travel time of the acoustic pulse by the distance by which the acoustic transducer is recessed. Since the minimum time represents the round trip time of the acoustic pulse, this value of mud velocity is divided by two.

While the foregoing disclosure is directed to the preferred embodiments of the invention, the foregoing is for purposes of example only and not intended to limit the scope of the invention which is defined by the following claims.

What is claimed is:

1. A downhole tool for measuring borehole standoff comprising:
    a transducer mounted on the tool for emitting a signal and detecting reflections of the emitted signal;
    a fixed target for reflecting a first portion of the emitted signal back to the transducer;
    a deflector for deflecting a second portion of the emitted signal toward a borehole wall and deflecting a reflection off the borehole wall of the second portion of the signal back to the transducer; and
    a processor for determining a distance from the transducer to the borehole wall.

2. The apparatus of claim 1, further comprising a mud channel wherein the first portion of the signal that is reflected off of the fixed target passes through the mud channel to determine the mud velocity, wherein the computed distance to the borehole wall is adjusted for changes in mud velocity.

3. The apparatus of claim 1 wherein the distance to the borehole wall is determined by dividing the round trip transit time to the borehole wall by the round trip transit time to the fixed target to obtain the distance to the borehole wall.

4. The apparatus of claim 3 wherein the borehole standoff is determined by subtracting the distance from the transducer to the fixed target from the total signal path to obtain the two way travel time.

5. The apparatus of claim 1 further comprising a 45° deflector to enable building a thin ultrasonic standoff sensor along the longitudinal axis of the apparatus.

6. The apparatus of claim 1, further comprising a 45° reflector and a 90° reflector to measure velocity and reflect the signal to the formation.

7. The apparatus of claim 1, further comprising a shaped deflector to focus the deflected acoustic beam on the borehole wall.

8. The apparatus of claim 7, further comprising a parabolic shaped deflector to focus the acoustic beam on the borehole wall.

9. The apparatus of claim 1, further comprising:
    a NMR tool; and
    a processor for combining a borehole rugosity measurement with the NMR tool to compensate for variations in NMR data associated with borehole rugosity.

10. The apparatus of claim 1, further comprising a processor for combining a borehole rugosity measurement with a side-looking NMR tool to determine when the data is corrupted by a mud signal.

11. The apparatus of claim 1 wherein the tool is conveyed into the borehole on one of (i) a wireline, (ii) a drillstring, and, (iii) coiled tubing.

12. The apparatus of claim 2 further comprising:
    at least one of (i) gamma-gamma density tool, (ii) neutron density tool, and (iii) NMR tool.

13. The apparatus of claim 11 wherein the borehole standoff is used to compensate data collected from the at least one (i) gamma-gamma density tool, (ii) neutron density tool, and (iii) NMR tool.

14. The apparatus of claim 1, further comprising a mud channel formed in the sensor wherein the first portion of the signal that is reflected off of the fixed target passes through the mud channel to determine attenuation of the emitted signal due to the mud, wherein the amplitude of the emitted signal is adjusted for mud attenuation.

15. A downhole tool for measuring borehole standoff comprising:

a recessed transducer mounted on the tool for emitting a signal and detecting reflections of the emitted signal;

a fixed target displaced longitudinally along the tool body from the transducer for reflecting a first portion of the emitted signal back to the transducer for determining mud velocity; and a processor for determining the distance from the transducer to the borehole wall, wherein the distance to the borehole wall is adjusted for changes in mud velocity.

16. The apparatus of claim 15, wherein the first portion of the signal that is reflected off of the fixed target passes through mud to determine attenuation of the emitted signal due to the mud, wherein the amplitude of the emitted signal is adjusted for mud attenuation.

17. A method for measuring borehole standoff downhole comprising:

emitting a signal from a transducer and detecting at the transducer reflections of the emitted signal;

reflecting from a fixed target, a first portion of the emitted signal back to the transducer;

deflecting a second portion of the emitted signal toward the borehole wall and deflecting a reflection off the borehole wall of the second portion of the signal back to the transducer; and determining the distance from the transducer to the borehole wall.

18. The method of claim 17, further comprising:

providing a mud channel formed in the sensor wherein the first portion of the signal that is reflected off of the fixed target passes through the mud channel to determine the mud velocity; and adjusting the distance to the borehole wall for changes in mud velocity.

19. The method of claim 18 wherein the distance to the borehole wall is determined by dividing the round trip transit time to the borehole wall by the round trip transit time to the fixed target to obtain the distance to the borehole wall.

20. The apparatus of claim 19 wherein the bore hole standoff is determined by subtracting the distance from the transducer to the fixed target from the total signal path to obtain the actual standoff.

21. The method of claim 17 further comprising:

providing a 45° reflector to enable building a thin ultrasonic standoff sensor.

22. The apparatus of claim 17, further comprising providing a 45° reflector and a 90° reflector to measure velocity and reflect the signal to the formation.

23. The method of claim 17, further comprising providing a shaped deflector to focus the deflected acoustic beam on the borehole wall.

24. The method of claim 23, further comprising providing a parabolic shaped reflector to focus the acoustic beam on the borehole wall.

25. The method of claim 18, further comprising:

a NMR tool providing for collecting NMR data; and a processor for combining a borehole rugosity measurement with the NMR tool data to compensate for variations in NMR data associated with borehole rugosity.

26. The method of claim 18, further combining a borehole rugosity measurement with a side-looking NMR tool to determine when the data is corrupted by a mud signal.

27. The method of claim 18 further comprising:

conveying a NMR logging tool into the borehole on one of (i) a wireline, (ii) a drillstring, and, (iii) coiled tubing.

28. The method of claim 19 further comprising:

providing at least one of (i) gamma-gamma density tool, (ii) neutron density tool, and (iii) NMR tool.

29. The method of claim 28 wherein the borehole standoff is used to compensate data collected from the at least one (i) gamma-gamma density tool, (ii) neutron density tool, and (iii) NMR tool.

30. A method for measuring borehole standoff downhole comprising:

emitting a signal from a transducer and detecting reflections at the transducer of the emitted signal to determine mud velocity;

reflecting a first portion of the emitted signal back to the transducer from a target displaced longitudinally along the tool body from the transducer; and determining the distance from the transducer to the borehole wall, wherein the computed distance to the borehole wall is adjusted for changes in mud velocity.

31. The method of claim 18, further comprising adjusting the amplitude of the emitted signal for mud attenuation.

32. The method of claim 30, further comprising adjusting the amplitude of the emitted signal for mud attenuation.

33. The apparatus of claim 1 wherein the transducer is recessed within the tool and the tool is positioned adjacent the borehole wall to measure the minimum two way travel time.

34. The method of claim 17 wherein the tool is positioned against the borehole wall during signal emission and reception, thereby determining the minimum two-way travel time.

* * * * *